(12) United States Patent
Inoue

(10) Patent No.: US 8,720,850 B2
(45) Date of Patent: May 13, 2014

(54) SUCK BACK VALVE SYSTEM AND VALVE-CLOSING-OPERATION CONTROL METHOD FOR THE SAME

(75) Inventor: Atsushi Inoue, Gyoda (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 779 days.

(21) Appl. No.: 12/682,045

(22) PCT Filed: Oct. 10, 2008

(86) PCT No.: PCT/JP2008/068438
§ 371 (c)(1),
(2), (4) Date: Apr. 8, 2010

(87) PCT Pub. No.: WO2009/051070
PCT Pub. Date: Apr. 23, 2009

(65) Prior Publication Data
US 2010/0207048 A1    Aug. 19, 2010

(30) Foreign Application Priority Data

Oct. 17, 2007   (JP) .................. 2007-270170

(51) Int. Cl.
*F16K 31/00*    (2006.01)
*B05B 15/00*    (2006.01)

(52) U.S. Cl.
USPC .................... 251/63.5; 239/119; 239/106

(58) Field of Classification Search
USPC ......... 251/62, 63, 63.4, 63.5, 63.6, 68.5, 284, 251/285; 239/119, 73, 106; 222/571
See application file for complete search history.

(56) References Cited

U.S. PATENT DOCUMENTS 4,597,719 A * 7/1986 Tano .............................. 417/317

(Continued)

FOREIGN PATENT DOCUMENTS

| JP | 63-13493 A | 6/1988 |
| JP | 7-19465 A | 1/1995 |

(Continued)

*Primary Examiner* — John K Fristoe, Jr.
*Assistant Examiner* — Daphne M Barry
(74) *Attorney, Agent, or Firm* — Muncy, Geissler, Olds & Lowe, P.C.

(57) ABSTRACT

There is provided a suck back valve system in which problems in the suck back function are resolved. In a suck back system including an integral-type suck back valve in which an on/off valve that performs opening and closing operations by a first pneumatic actuator has a suck back function of preventing liquid dripping by means of a diaphragm that moves with the closing operation and a protective on/off valve provided at the upstream side adjacent to the integral-type suck back valve as a measure against malfunction in the integral-type suck back valve and performing opening and closing operations by a second pneumatic actuator, an opening and closing control unit is provided that, during the fully closing operation of the integral-type suck back valve, completes the fully closing operation of the protective on/off valve earlier than full closing of the integral-type suck back valve.

10 Claims, 6 Drawing Sheets

(56) References Cited

U.S. PATENT DOCUMENTS

| | | | |
|---|---|---|---|
| 5,857,661 A | 1/1999 | Amada et al. | |
| 5,971,296 A * | 10/1999 | Fukano et al. | 239/119 |
| 6,029,903 A * | 2/2000 | Fukano et al. | 239/119 |
| 6,176,438 B1 * | 1/2001 | Sato et al. | 239/119 |
| 6,199,582 B1 | 3/2001 | Matsuzawa et al. | |
| 6,200,100 B1 * | 3/2001 | Yang et al. | 417/26 |
| 6,755,354 B2 * | 6/2004 | Fukano et al. | 239/119 |
| 7,070,160 B2 * | 7/2006 | Ijichi et al. | 251/63.5 |
| 7,143,956 B2 * | 12/2006 | Fukano | 239/119 |
| 7,337,805 B2 * | 3/2008 | Brown et al. | 137/625.33 |
| 7,445,163 B2 * | 11/2008 | Fukano et al. | 239/119 |
| 2004/0007686 A1 * | 1/2004 | Kingsford et al. | 251/335.3 |
| 2005/0006609 A1 | 1/2005 | Fukano | |
| 2005/0284954 A1 | 12/2005 | Fukano et al. | |
| 2010/0038567 A1 * | 2/2010 | Inoue | 251/63.6 |

FOREIGN PATENT DOCUMENTS

| | | |
|---|---|---|
| JP | 8-128389 A | 5/1996 |
| JP | 11-082763 | 3/1999 |
| JP | 2000-193106 A | 7/2000 |
| JP | 2002-316085 A | 10/2002 |
| JP | 2003-278927 A | 10/2003 |
| JP | 2005-090639 A | 4/2005 |
| JP | 2005-90639 A | 4/2005 |
| JP | 2005-240762 A | 9/2005 |
| JP | 2005-305396 A | 11/2005 |
| JP | 2006-57663 A | 3/2006 |
| JP | 2007-178006 A | 7/2007 |

* cited by examiner

SUCK BACK VALVE SYSTEM AND VALVE-CLOSING-OPERATION CONTROL METHOD FOR THE SAME

This application is a national stage of International Application No.: PCT/JP 2008/068438, which was filed on Oct. 10, 2008, and which claims priority to Japanese Patent Application No.: 2007-270170, which was filed in Japan on Oct. 17, 2007, and which are both herein incorporated by reference.

TECHNICAL FIELD

The present invention relates to a suck back valve system and a valve-closing-operation control method for the same.

BACKGROUND ART

In the related art, an on/off valve disposed in a piping system that handles liquid, such as a chemical solution, is provided with a separate suck-back only valve alongside thereof to prevent liquid dripping (fluid drops) from occurring during a fully closing operation. Such a suck-back only valve operates in synchronization with the closing operation of the on/off valve and can prevent liquid dripping by sucking the liquid at an outlet side to a suck back chamber side by operating a diaphragm in a direction in which the volume of the suck back chamber is increased (for example, refer to Patent Citation 1)

Moreover, because the on/off valve and the suck back valve described above are separate from each other, an integral-type suck back valve with a structure in which both valves are integrated has been proposed by the applicant with the aim of reducing the installation space of the entire apparatus and solving the problem of synchronizing the actuator etc.

On the other hand, a protective on/off valve is sometimes disposed at the upstream side of the integral-type suck back valve as a protective measure in the event that the integral-type suck back valve malfunctions. For the suck back valve system configured having both the integral-type suck back valve and the protective on/off valve in this manner, it is desirable to operate the protective on/off valve provided as a measure against the malfunction of the integral-type suck back valve at a position as close as possible to the integral-type suck back valve with the minimum time lag to minimize the fluid outflow in the event that the integral-type suck back valve is not closed (not operated).

Patent Citation 1: Japanese Unexamined Patent Application, Publication No. 2002-316085

DISCLOSURE OF INVENTION

In the suck back system described above, when the protective on/off valve is closed at an upstream position close to the integral-type suck back valve substantially at the same time, liquid sometimes drips from the integral-type suck back valve due to the influence of water hammer. That is, the occurrence of problems in the suck back function of the integral-type suck back valve has been noted due to the protective on/off valve provided at the upstream side of the integral-type on/off valve.

The present invention is made in consideration of the above-described circumstances, and it is an object thereof to provide a suck back valve system in which problems in the suck back function are resolved, as well as a valve-closing-operation control method for the same.

The present invention adopts the following solutions to solve the problems described above.

In a suck back system according to the present invention including an integral-type suck back valve in which an on/off valve that performs opening and closing operations by a first pneumatic actuator has a suck back function of preventing liquid dripping by means of a diaphragm that moves with the closing operation and a protective on/off valve provided at the upstream side adjacent to the integral-type suck back valve as a measure against malfunction in the integral-type suck back valve and performing opening and closing operations by a second pneumatic actuator, an opening and closing control unit is provided that, during the fully closing operation of the integral-type suck back valve, completes the fully closing operation of the protective on/off valve earlier than full closing of the integral-type suck back valve.

Such a suck back valve system is equipped with the opening and closing control unit that, during the fully closing operation of the integral-type suck back valve, completes the fully closing operation of the protective on/off valve earlier than full closing of the integral-type suck back valve. This can therefore prevent the occurrence of water hammer from the integral-type suck back valve that is fully closed later than the protective on/off valve.

In a valve-closing-operation control method for a suck back system according to the present invention, the suck back system including an integral-type suck back valve in which an on/off valve that performs opening and closing operations by a first pneumatic actuator has a suck back function of preventing liquid dripping by means of a diaphragm that moves with the closing operation and a protective on/off valve provided at the upstream side adjacent to the integral-type suck back valve as a measure against malfunction in the integral-type suck back valve and performing opening and closing operations by a second pneumatic actuator, during the fully closing operation of the integral-type suck back valve, the fully closing operation of the protective on/off valve is completed earlier than full closing of the integral-type suck back valve.

According to such a valve-closing-operation control method for the suck back valve system, during the fully closing operation of the integral-type suck back valve, the valve closing operation is controlled so that the fully closing operation of the protective on/off valve is completed earlier than full closing of the integral-type suck back valve. This can therefore prevent the occurrence of water hammer from the integral-type suck back valve that is fully closed later than the protective on/off valve.

According to the present invention described above, during the fully closing operation of the integral-type suck back valve, the fully closing operation of the protective on/off valve is completed earlier than full closing of the integral-type suck back valve. This can therefore prevent the occurrence of water hammer from the integral-type suck back valve that is fully closed later than the protective on/off valve, thereby resolving problems in the suck back function caused by the water hammer.

EXPLANATION OF REFERENCE

Figure 1:
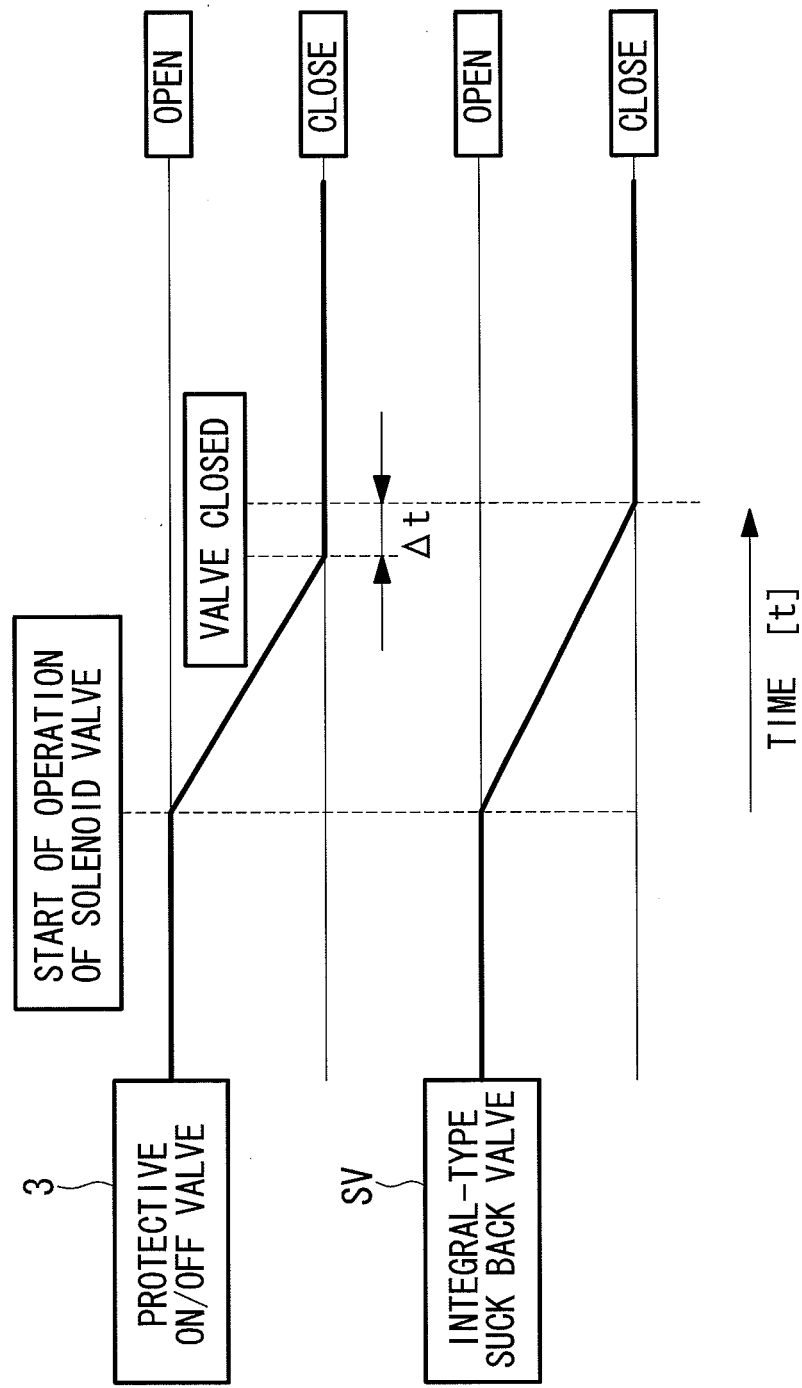
FIG. 1 shows a time chart for a case in which a protective on/off valve and an integral-type suck back valve are closed, as an embodiment of a suck back valve system and a valve-closing-operation control method for the same according to the present invention.

1: suck back valve system
3: protective on/off valve
5a, 5b: solenoid valve
6a, 6b: speed controller
10: on/off valve
11: valve element
12: valve main body
13: fluid inlet
13a: inlet channel
14: fluid outlet
14a: outlet channel
15: inner space
16: fluid channel
17: suck back chamber
18: seat portion
19: lower diaphragm
19a: base portion
20: coil spring
21: air exhaust channel
22: valve element shaft portion
30: actuator
31: piston
32: actuator main body
33: cylindrical portion
34, 35: air-pressure supply port
36: plug
37: coil spring
38: handle
39: screw shaft
39a: end portion
40: coil-spring installation space
41: through-hole
50: shaft unit
51: piston shaft portion
52: loosely engaged shaft portion
52a: lower end surface
53: air exhaust passage
54: loosely engaging portion
60: diaphragm
61: base portion
62: bellows
63: diaphragm main body
64: outer edge portion
70: channel
71: common base

BEST MODE FOR CARRYING OUT THE INVENTION

An embodiment of a suck back valve system and a valve-closing-operation control method for the same according to the present invention will be described hereinbelow based on the drawings.

Figure 2:
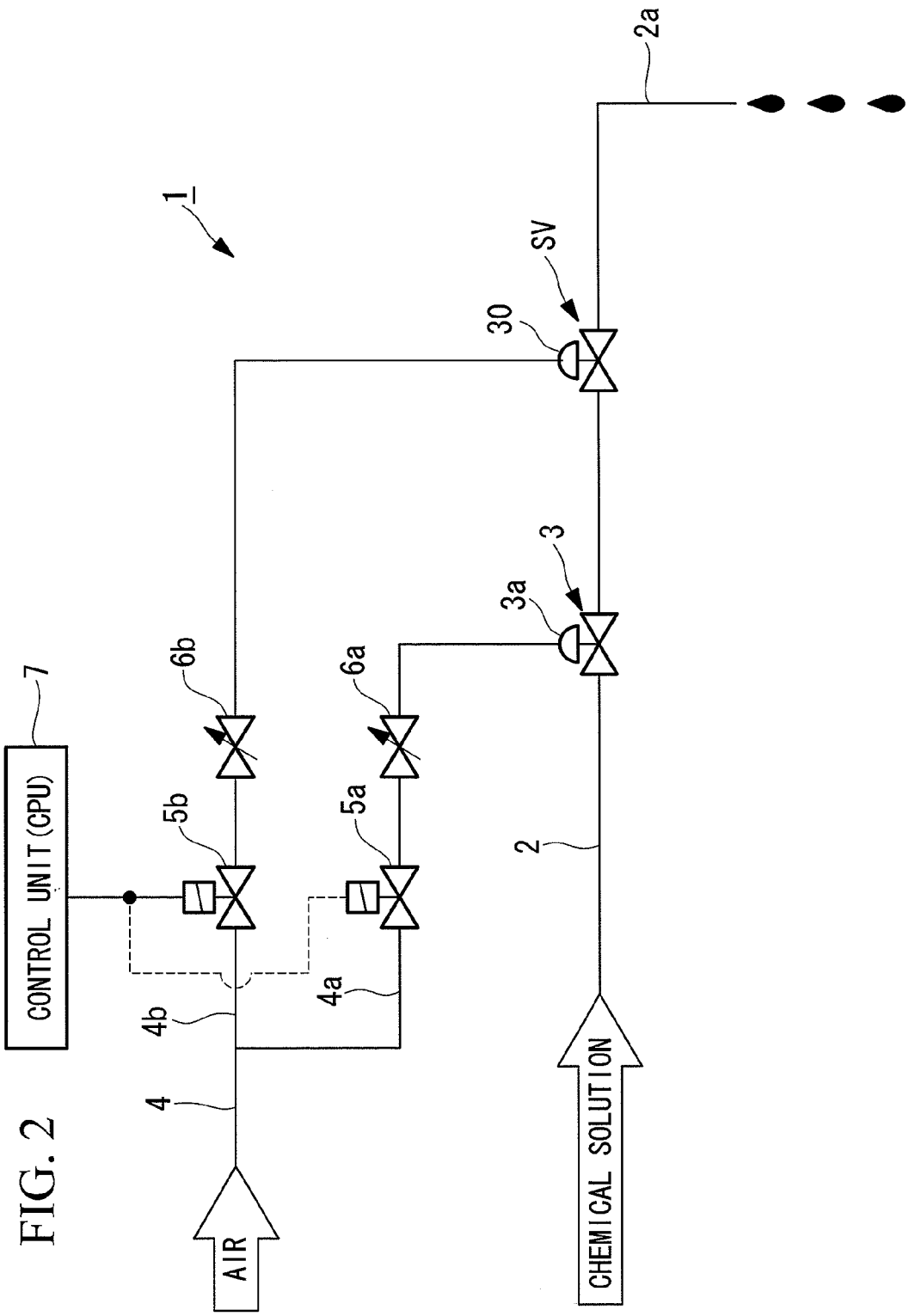
FIG. 2 is a diagram showing a configuration example of the suck back system.

A suck back system 1 shown in FIG. 2 is provided in a piping channel or the like through which a chemical solution flows in the form of a fluid. In this suck back system 1, a pipe 2 through which the chemical solution flows is provided with a protective on/off valve 3 and an integral-type suck back valve SV in this order from the upstream side. Accordingly, when the integral-type suck back valve SV is fully closed, no liquid drips from an outlet end 2a of the pipe 2 at the downstream side of the integral-type suck back valve SV.

The protective on/off valve 3 is a pneumatic valve that is actuated by a pneumatic actuator 3a provided at the top. The protective on/off valve 3 is provided adjacent to the suck back valve SV in the vicinity of the upstream side as a measure against malfunction of the integral-type suck back valve SV, that is, as a safeguard in the event that the integral-type suck back valve SV is not completely closed or the like.

The pneumatic actuator 3a operates by receiving, at a piston, a supply of air pressure that is adjusted to a predetermined pressure from a pneumatic pipe 4 connected to an air supply source (not shown) and can open and close a valve element in response to turning the air pressure ON/OFF.

The pneumatic pipe 4 is branched into a pneumatic pipe 4a connected to the pneumatic actuator 3a of the protective on/off valve 3 and a pneumatic pipe 4b connected to a pneumatic actuator 30 of the integral-type suck back valve SV, to be described later. The pneumatic pipes 4a and 4b are provided with solenoid valves 5a and 5b and speed controllers 6a and 6b, respectively.

The solenoid valves 5a and 5b are on/off valves that turn on/off the supply of air pressure. In this case, three-way valves are adopted as the solenoid valves 5a and 5b to exhaust the air pressure at the pneumatic actuators 3a and 30 when the supply of air pressure is turned off.

The speed controllers 6a and 6b have a flow-rate adjusting function for the air pressure supplied to the pneumatic actuators 3a and 30. Accordingly, by changing the settings of the speed controllers 6a and 6b, the timing at which the pneumatic actuators 3a and 30 are actuated, that is, the timing at which the protective on/off valve 3 and the integral-type suck back valve SV open and close, can be adjusted. The speed controllers 6a and 6b used here are of a meter-out type.

A control unit 7 performs opening/closing control etc. of the solenoid valves 5a and 5b.

Figure 3:
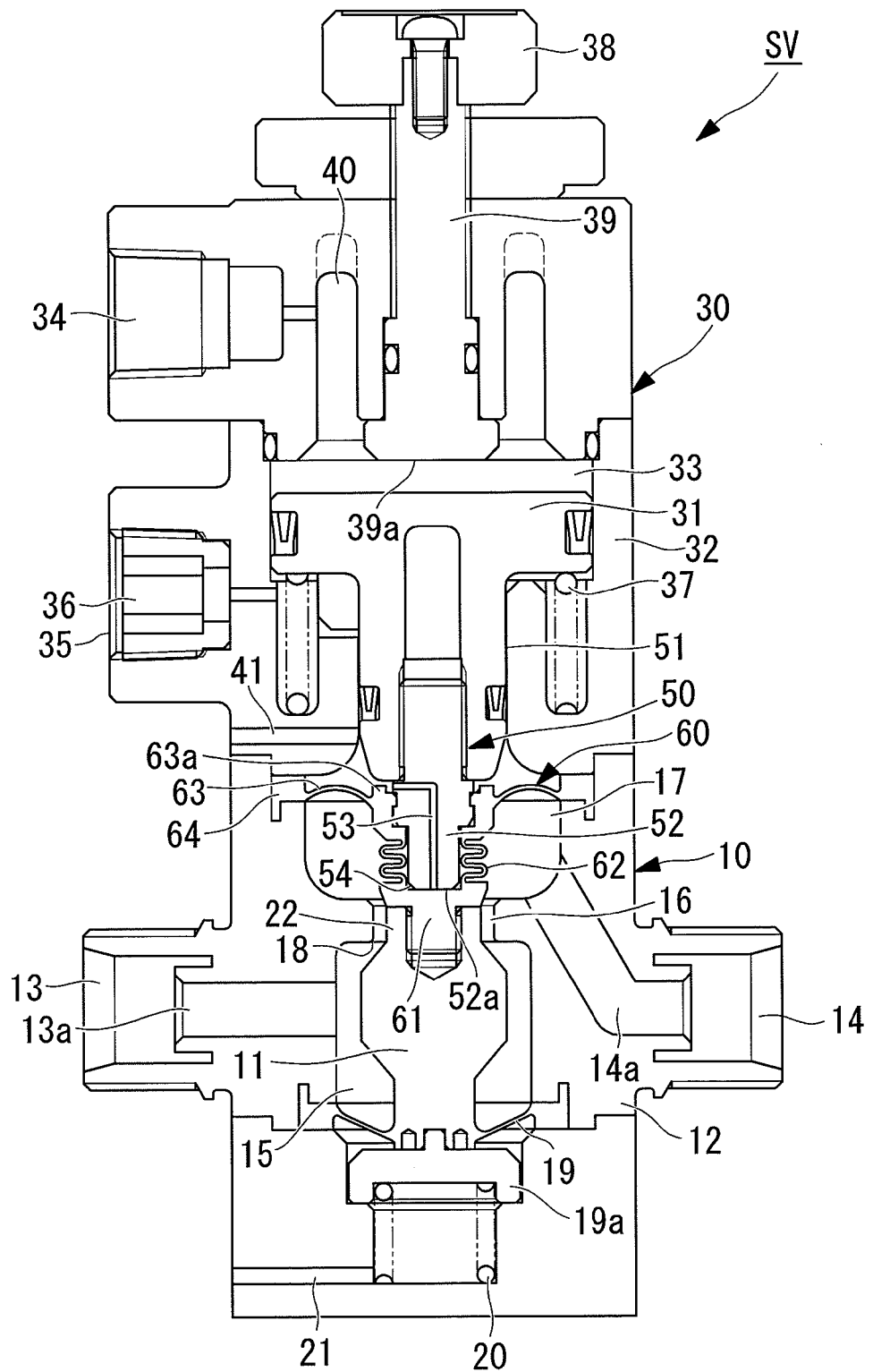
FIG. 3 is a diagram showing a configuration example of the integral-type suck back valve, showing a state in which the on/off valve is fully open.
Figure 4:
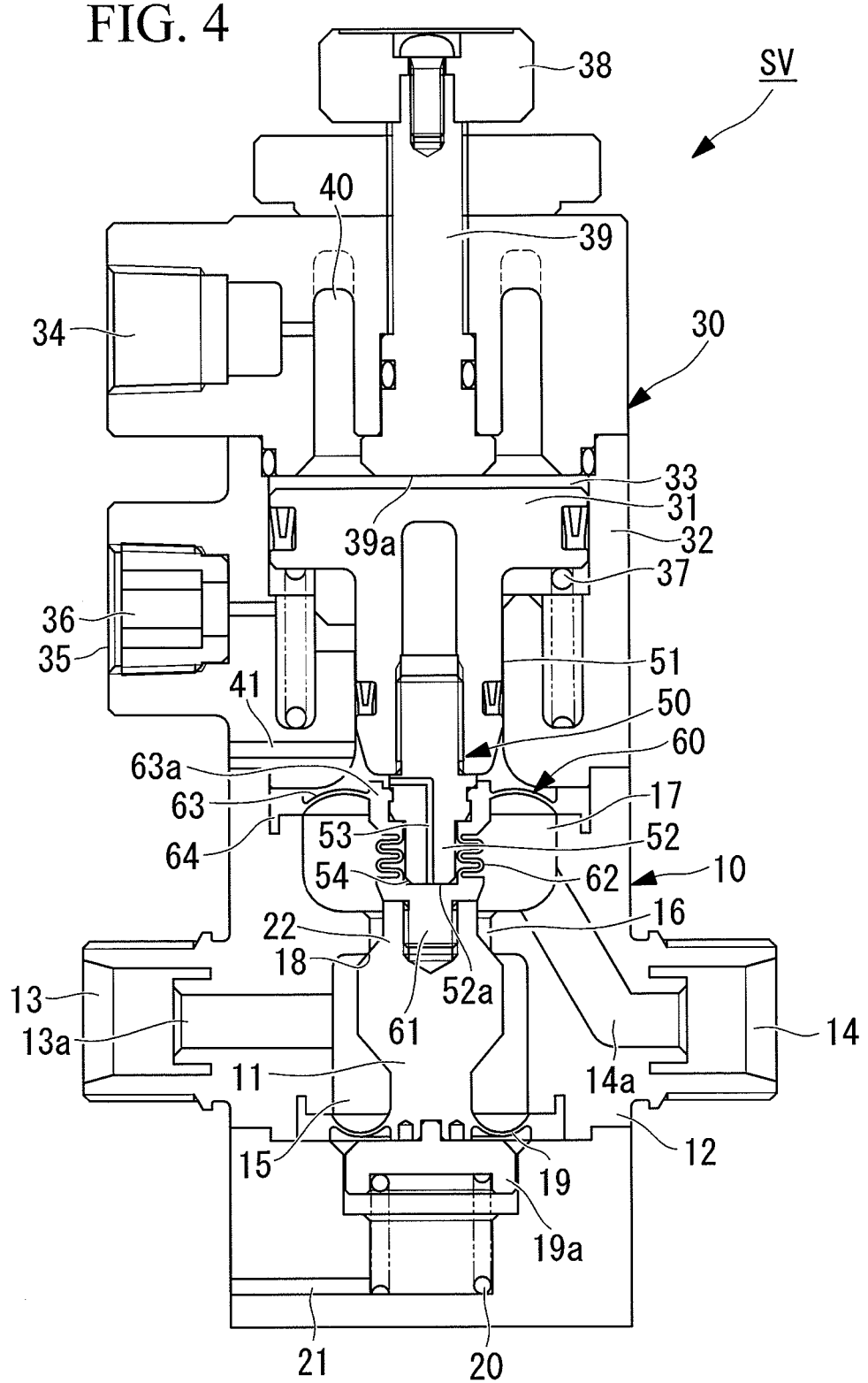
FIG. 4 is a diagram showing a configuration example of the integral-type suck back valve, showing a state before the suck back function is activated, with the on/off valve fully closed.
Figure 5:
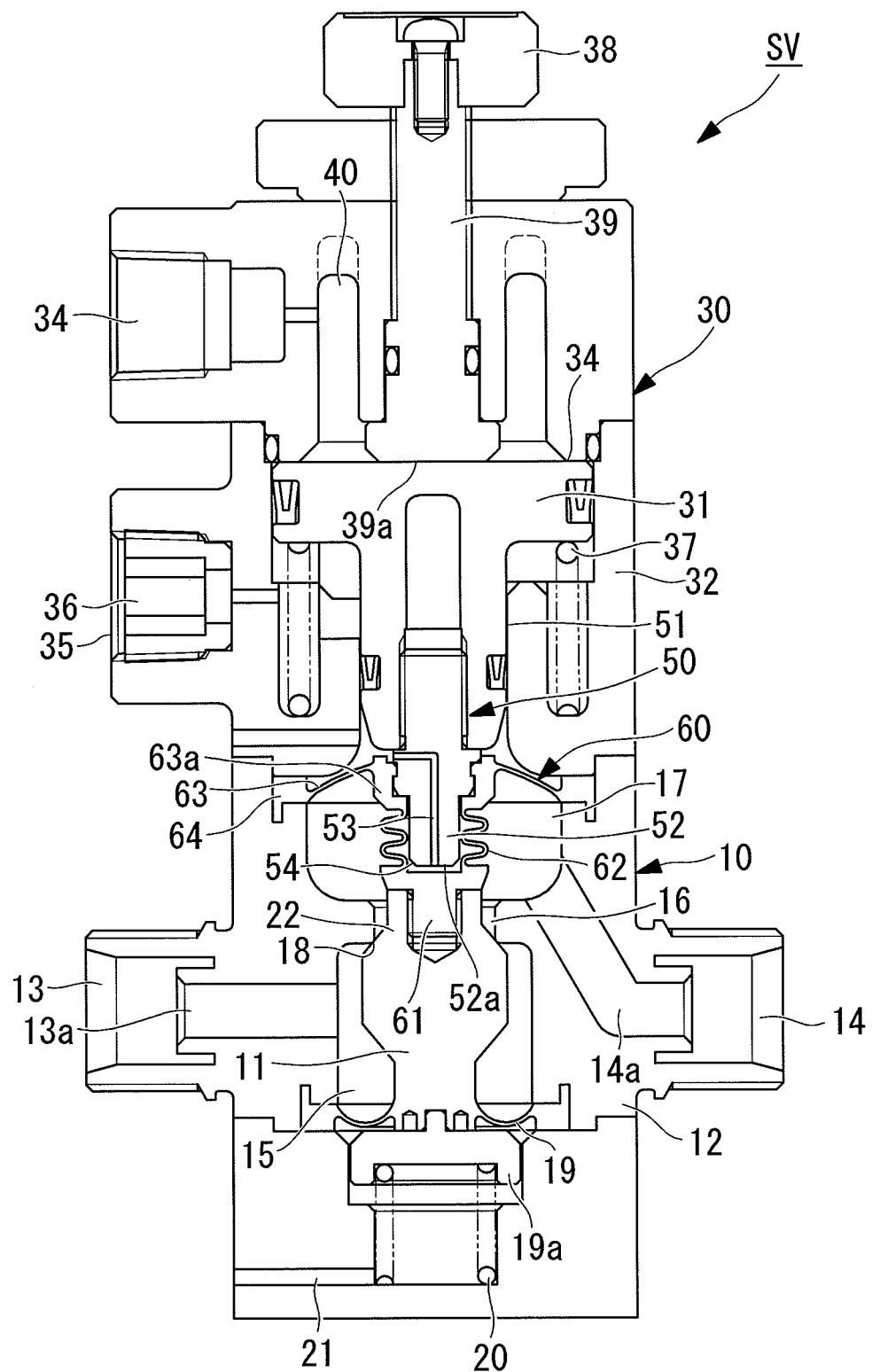
FIG. 5 is a diagram showing a configuration example of the integral-type suck back valve, showing a state in which the suck back function is activated from the state in FIG. 4.

The integral-type suck back valve SV is configured as shown in FIGS. 3 to 5, for example.

The suck back valve SV shown in the drawings is disposed in a channel through which liquid, such as a chemical solution, flows and is configured such that an on/off valve 10 having a suck back function for preventing the liquid from dripping at a fully closed position and the actuator 30 for an opening/closing operation are integrated. That is, the suck back valve SV is configured such that a piston 31 of the actuator 30 that receives air pressure for operating the actuator and a valve element 11 that performs an opening/closing operation for the on/off valve 10 are connected with a shaft unit 50 and such that the on/off valve 10 that performs the opening/closing operation by means of air pressure has the suck back function.

For the illustrated suck back valve SV, FIG. 3 shows a state in which the on/off valve 10 is fully open, FIG. 4 shows a state before the suck back function is activated, with the on/off valve 10 fully closed, and FIG. 5 shows a state in which the suck back function is activated from the state shown in FIG. 4.

The basic configuration of the on/off valve 10 is as follows: a valve main body (casing) 12 has a fluid inlet 13 and a fluid outlet 14; and the valve element 11 that opens and closes a fluid channel 16 is disposed in an inner space 15 of the valve main body 12. A suck back chamber 17 that communicates with the inner space 15 through the fluid channel 16 is formed above the fluid channel 16. The suck back chamber 17 is a space serving as part of a channel (hereinafter, referred to as "in-valve channel") through which the liquid flows in the on/off valve 10 and in which part of the shaft unit 50 connected to the valve element 11 is disposed. This suck back chamber 17 is also a space that achieves the suck back function by increasing in volume by moving a diaphragm 60, to be described later.

The fluid inlet 13 communicates with the inner space 15 through an inlet channel 13a, and the fluid outlet 14 communicates with the suck back chamber 17 through an outlet channel 14a.

The valve element 11 described above is operatively connected to the actuator 30, to be described later, and moves up and down in the inner space 15 together with the piston 31 and the shaft unit 50 to thereby open and close the fluid channel 16 formed in the on/off valve 10. The upper end of the inner space 15, in other words, the inlet of the fluid channel 16 is provided with a seat portion 18. When the valve element 11 moves upward to come into close contact with the seat portion 18, the on/off valve 10 closes the fluid channel 16, and when the valve element 11 moves downward to come away from the seat portion 18, the on/off valve 10 opens the fluid channel 16.

The in-valve channel formed in the on/off valve 10 is arranged in the fluid inlet 13, the inlet channel 13a, the inner space 15, the fluid channel 16, the suck back chamber 17, the outlet channel 14a, and the fluid outlet 14 in this order in the flow direction in the on/off valve 10.

In the illustrated on/off valve 10, reference numeral 19 in the drawings denotes a lower diaphragm whose base portion 19a is connected to the lower part of the valve element 11, reference numeral 20 denotes a coil spring that urges the base portion 19a upward, and reference numeral 21 denotes an air exhaust channel. In addition, since the lower part of the valve element 11 is reduced in size to have a small diameter, the lower diaphragm 19 can be reduced in diameter.

The actuator 30 has the piston 31 disposed in a cylindrical portion 33 of the inner space formed in an actuator main body 32 and supplies air pressure to one side of the cylindrical portion 33, separated by the piston 31, to open and close the on/off valve 10. In the configuration example shown in the drawings, the actuator main body 32 is provided with two air-pressure supply ports 34 and 35, one of which can be selected for use. In this case, the air-pressure supply port 34 disposed at the top supplies air pressure to the top surface side of the piston 31 that slides in the cylindrical portion 33 in the axial direction, and the air-pressure supply port 35 disposed at the bottom supplies air pressure to the lower surface side of the piston 31 that slides in the cylindrical portion 33 in the axial direction.

In the example shown in the drawings, the air pressure is supplied through the upper air-pressure supply port 34, and the lower air-pressure supply port 35 is closed by a plug 36.

The piston 31 described above is constantly subjected to upward urging from coil springs 37 (in the direction in which the valve element 11 is closed), and thus, the on/off valve 10 shown in the drawings is of a normally closed type that is constantly closed in a state without any supply of air pressure. That is, the valve element 11 is in a constantly closed state due to the urging of the coil springs 37; however, when air pressure is supplied through the air-pressure supply port 34 to push the piston 31 downward, the valve element 11 connected thereto with the shaft unit 50 is pushed down by overcoming the urging of the coil springs 20 and 37. As a result, the valve element 11 comes apart from the seat portion 18 into an open state.

In addition, when the supply of air pressure through the air-pressure supply port 34 is stopped, the downward pressing force by the piston 31 is eliminated, and therefore, the valve element 11 comes into close contact with the seat portion 18 by receiving the urging of the coil springs 20 and 37 into a closed state.

For the suck back function described later, the actuator 30 described above has suck-back-level adjusting means for controlling the amount of axial movement of the shaft unit 50 on the piston 31 side. The suck-back-level adjusting means is a screw shaft 39 that moves in the axial direction by operating a handle 38 to allow adjustment of the amount of projection of an end portion 39a into the cylindrical portion 33. That is, increasing the amount of projection of the end portion 39a into the cylindrical portion 33 decreases the range in which the piston 31 can rise (piston stroke); therefore, a suck back level (a change in the volume of the suck back chamber 17) that is determined by the amount of movement (the amount of deformation) of a diaphragm 60, described later, is also decreased.

Reference numeral 40 in the drawings denotes a coil spring installation space, which is used as necessary, such as when the actuation method of the on/off valve 10 or the actuator 30 (normally closed or normally open) is selected and changed.

Subsequently, the shaft unit 50, which is a member connecting the piston 31 and the valve element 11 and opening and closing the valve element 11 of the on/off valve 10 by the operation of the actuator 30, will be described.

The shaft unit 50 includes a piston shaft portion 51 provided at the lower surface side of the piston 31 and a valve element shaft portion 22 provide at the upper part of the valve element 11. A loosely engaged shaft portion 52 is screwed into an axial center position of the piston shaft portion 51 so as to project downward from the lower surface. The loosely engaged shaft portion 52 has an air exhaust channel 53 that communicates from a lower end surface 52a through the axial center position to a shaft-side surface. The air exhaust channel 53 serves as a channel for the air in a loosely engaging portion 54 narrowed by the loosely engaged shaft portion 52 to flow out therethrough to smoothly operate the suck back function, described later. The air that has flowed out to the exterior of the loosely engaging portion 54 through the air exhaust channel 53 flows out to the atmosphere through a through-hole 41 provided in the actuator main body 32.

A base portion 61 of the diaphragm 60 is connected to the upper surface of the valve element shaft portion 22 by screwing. The base portion 61 is integrally provided with a bellows 62 that covers the circumference of the above-described loosely engaged shaft portion 52, and furthermore, the upper end of the bellows 62 is provided with an upper-end base portion 63a engaged with the loosely engaged shaft portion 52. The upper-end base portion 63a is engaged with the loosely engaged shaft portion 52 by means of the corresponding protrusions and depressions so as to integrally move in the axial direction.

The upper-end base portion 63a is integrally provided with a diaphragm main body 63 extending in the horizontal direction. Furthermore, the outer circumference of the diaphragm main body 63 is provided with an outer edge portion 64 clamped and fixed between the on/off valve 10 and the actuator 30. Accordingly, the diaphragm main body 63 covers the upper part of the suck back chamber 17 to separate it from the actuator 30 side, and the diaphragm main body 63 operates together with the loosely engaged shaft portion 52.

Furthermore, the loosely engaging portion 54 that allows the loosely engaged shaft portion 52 to move in the axial direction is formed inside the bellows 62 on the upper surface side of the base portion 61. Accordingly, the loosely engaging portion 54 is provided closer to the actuator 30 side than to the diaphragm 60, and the fluid flowing in the on/off valve 10 is completely separated from the driving section of the actuator 30 by the diaphragm 60. That is, the diaphragm 60 is installed so as to separate the suck back chamber 17 at the on/off valve 10 side and the actuator 30 from each other, and the loosely engaged shaft portion 52 of the actuator 30 is configured to operate in a region that does not contact the fluid, such as a chemical solution.

Thus, the suck back valve SV is configured such that the suck back chamber 17 formed in the in-valve channel of the on/off valve 10 and the actuator 30 that operates the piston 11 are separated from each other by the diaphragm 60 connected to the shaft unit 50 and actuated together therewith. The shaft unit 50 is divided into a valve-element-side shaft portion constituted of the valve element shaft portion 22 and a piston-side shaft unit constituted of the piston shaft portion 51 and the loosely engaged shaft portion 52, and the loosely engaged shaft portion 52 of the piston-side shaft unit is loosely engaged with the base portion 61 of the diaphragm 60 that is integrally connected to the valve element side shaft 22 to allow independent axial operation.

Accordingly, when closing the valve element 11, a two-step operation is performed, that is, a valve closing operation step in which the shaft unit 50 moves to the fully closed position of the valve element 11 together with the piston 31 and the diaphragm 60 and a suck back operation step in which the piston shaft portion 51 and the loosely engaged shaft portion 52 of the piston side shaft unit move together with the piston 31 and the diaphragm main body 61 of the diaphragm 60 to increase the volume of the suck back chamber 17.

More specifically, since the suck back valve SV in the fully open state shown in FIG. 3 loses the downward pressure due to the piston 31 by stopping the supply of air pressure to the air-pressure supply port 34, the valve element 11 is pushed up together with the piston and the shaft unit 50 due to the urging of the coil springs 20 and 37. As a result, as shown in FIG. 4, the valve element 11 comes into close contact with the seat portion 18 to close the fluid channel 16, so that the on/off valve 10 comes into the fully closed state to complete the valve closing operation step of the valve element 11. In this step, since the lower end surface 52a of the loosely engaged shaft portion 5 is in close contact with the base portion 61 of the diaphragm 60 as in the fully open state in FIG. 3 described above, the suck back function is not activated.

After completion of the above-described valve closing operation step, the valve element 11 is secured to the seat portion 18 to be prevented from rising more, and therefore, the loosely engaged shaft portion 52 moves away from the base portion 60 and rises together with the piston 31 and the shaft unit 50. As a result, the upper-end base portion 63a of the diaphragm main body 63 is raised together with the loosely engaged shaft portion 52, so that the diaphragm main body 63 is deformed to increase the volume of the suck back chamber 17, as shown in FIG. 5. When the piston 31 returns to the upper end portion of the actuator main body 32, the increase in the volume of the suck back chamber 17 ends, thus completing the suck back operation step. When the volume of the suck back chamber 17 is increased in this way, in the in-valve channel of the on/off valve 10 isolated by the closing of the valve element 11, the fluid remaining at the downstream side of the valve element 11 is sucked to the suck back chamber 17 side, thereby allowing liquid dripping to be prevented.

If the amount of projection of the screw shaft 39a is changed by operating the handle 38, the position to which the piston 31 rises and returns is changed, which also changes the stroke of the loosely engaged shaft portion 52 and the amount of deformation of the diaphragm main body 63. Accordingly, the amount of change (suck back level) of the volume of the suck back chamber 17, which increases in accordance with the deformation of the diaphragm main body 17, can be adjusted.

Thus, with the suck back valve SV described above, the opening and closing operation of the on/off valve 10 and the suck back function using the diaphragm 60 can be performed by one actuator 30. That is, because the suck back valve SV in which the on/off valve 10 has the suck back function is provided, the suck back valve SV in which the function of the on/off valve and the suck back function are integrated can not only reduce the installation space but also solve the problem of synchronization of the actuator.

Furthermore, the loosely engaging portion 54 that performs the suck back operation is configured such that the shaft portion 52 that achieves the operation of the suck back function is separated by the bellows 62 so as not to come into contact with the fluid flowing through the in-valve channel, which therefore prevents the handled liquid, such as a chemical solution, from attaching to the loosely engaging portion. Accordingly, this provides a suck back valve SV in which the occurrence of malfunction of the suck back function is prevented and which has high reliability.

As described above, in the suck back system 1 including an integral-type suck back valve SV in which an on/off valve 10 that performs opening and closing operations by a first pneumatic actuator 30 has a suck back function for preventing liquid dripping by means of a diaphragm 60 that moves with the closing operation and a protective on/off valve 3 provided at the upstream side adjacent to the integral-type suck back valve SV as a measure against malfunction in the integral-type suck back valve SV and performing opening and closing operations by a second pneumatic actuator 3a, the suck back system 1 includes an opening and closing control unit that, during the fully closing operation of the integral-type suck back valve SV, completes the fully closing operation of the protective on/off valve 3 earlier than full closing of the integral-type suck back valve SV.

The opening and closing control unit in this case includes the control unit (CPU) 7 that opens and closes the solenoid valves 5a and 5b at the same time and the speed controllers 6a and 6b that have a flow-rate adjusting function for air pressure to be supplied to the pneumatic actuators 3a and 30. Thus, by setting the speed controllers 6a and 6b different, the timing at which the pneumatic actuators 3a and 30 operate, that is, the timing at which the protective on/off valve 3 and the integral-type suck back valve SV open and close, can be adjusted.

FIG. 1 shows a time chart of a case in which the protective on/off valve 3 and the integral-type suck back valve SV that constitute the suck back valve system 1 perform the closing operation.

According to this drawing, when the opening and closing operations of the solenoid valves 5a and 5b are started by the control unit 7 at the same time, the speed controllers 6a and 6b with different settings are activated to fully close the protective on/off valve 3 earlier by time At. That is, when the closing operation of closing the solenoid valves 5a and 5b to discharge air pressure from the pneumatic actuators 3a and 30 is performed, the air pressure flows through the speed controllers 6a and 6b; therefore, a time difference will occur between the protective on/off valve 3 and the on/off valve 10 of the integral-type suck back valve SV by the time the fully closing operation is completed.

Accordingly, during the fully closing operation of the integral-type suck back valve SV, completing the fully closing operation of the protective on/off valve 3 earlier than full closing of the integral-type suck back valve SV by the opening and closing control unit can prevent generation of water hammer from the integral-type suck back valve SV that is fully closed later than the protective on/off valve 3. That is, since the protective on/off valve 3 is fully closed earlier than full closing of the on/off valve 10 of the integral-type suck back valve SV, the flow of the chemical solution has already been interrupted at the upstream side of the on/off valve 10, and thus, no water hammer occurs at the on/off valve 10 side.

Thus, the prevention of water hammer in the integral-type suck back valve SV that is fully closed later than the protective on/off valve 3 by the valve-closing-operation control method that completes the fully closing operation of the protective on/off valve 3 earlier than full closing of the integral-type suck back valve SV during the fully closing operation of the integral-type suck back valve SV eliminates excessive actuation of the diaphragm 60, which is influenced by water hammer, thereby preventing liquid dripping from the outlet end 2a of the pipe 2.

That is, the fully closing operation of the protective on/off valve 3 is completed earlier than full closing of the integral-type suck back valve SV during the fully closing operation of the integral-type suck back valve SV. This can therefore prevent the occurrence of water hammer from the integral-type suck back valve SV that is fully closed later than the protective on/off valve 3, thereby resolving problems in the suck back function, namely, liquid dripping occurring due to the water hammer.

Figure 6:
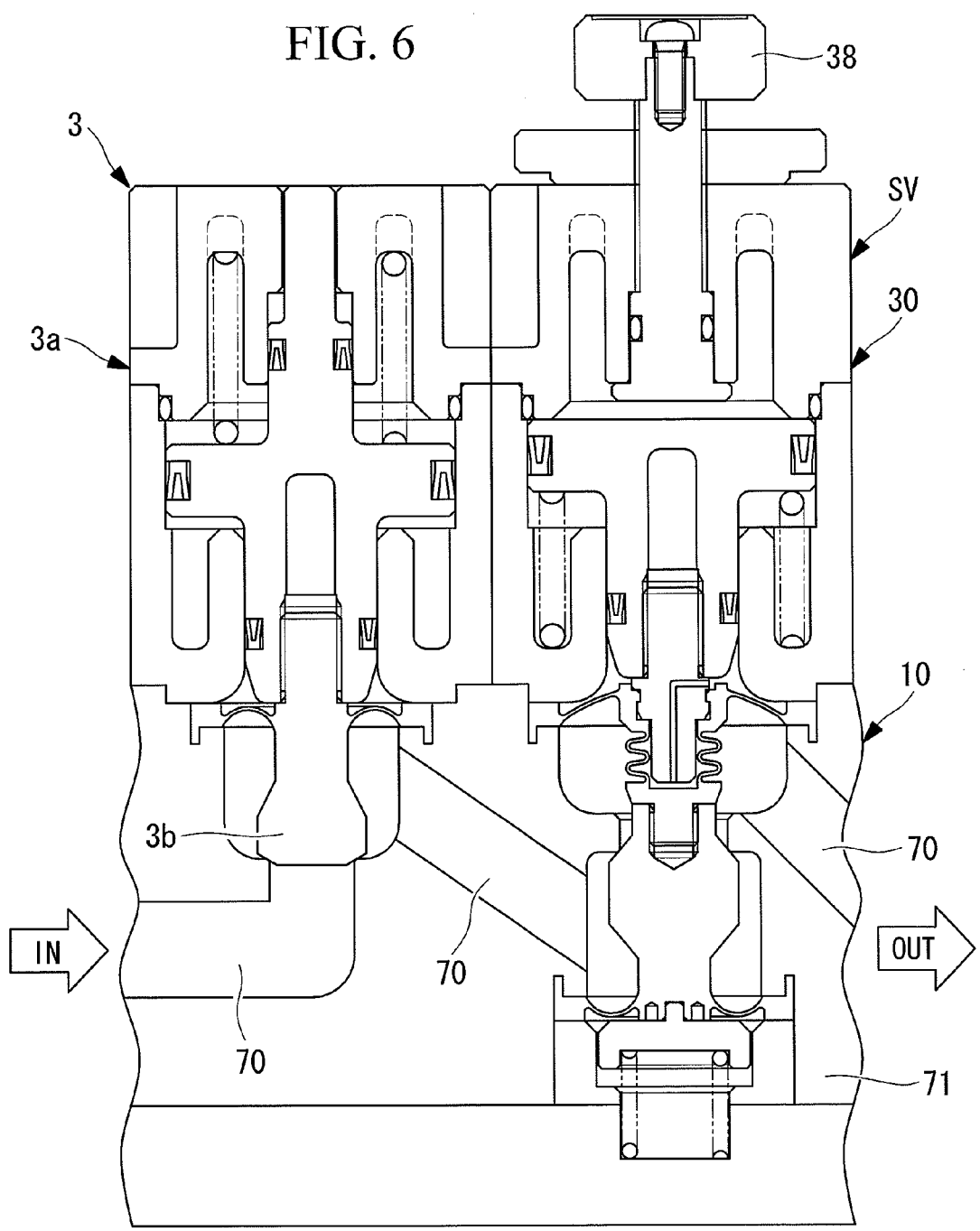
FIG. 6 is a diagram showing a configuration example in which the protective on/off valve and the integral-type suck back valve are integrated.

In the above-described embodiment, the suck back valve system 1 is constituted of the protective on/off valve 3 and the integral-type suck back valve SV which are separate from each other; alternatively, both valves may be integrated (unified) to achieve size reduction, as shown in FIG. 6, for example. In this case, the protective on/off valve 3 and the integral-type suck back valve SV are integrated by being mounted to a common base 71 in which a channel 70 corresponding to the pipe 2 is formed. Reference numeral 3b in the drawing denotes the valve element of the protective on/off valve 3.

The present invention is not limited to the above-described embodiments, and various modifications can be made without departing from the spirit of the present invention.

The invention claimed is:

1. A suck back system, comprising:
   an integral-type suck back valve, the integral-type suck back valve comprising:
      an on/off valve, operated bye first pneumatic actuator so as to close and open a fluid channel; and
      a suck back diaphragm provided at a downstream side in the fluid channel relative to the on/off valve, for performing a suck back function by being deformed after the on/off valve is operated to close the fluid channel;
   a protective on/off valve provided at an adjacent upstream side in the fluid channel relative to the on/off valve of the integral-type suck back valve, the protective on/off valve configured to perform a fully closing operation to fully close the fluid channel at the adjacent upstream side in the fluid channel relative to the on/off valve by a second pneumatic actuator; and
   an opening and closing control unit that controls the protective on/off valve to complete the fully closing operation of the protective on/off valve earlier than full closing of the on/off valve of the integral-type suck back valve when the on/off valve of the integral-type suck back valve is operated to close the fluid channel.

2. The suck back system according to claim 1, further comprising:
   a branched pneumatic pipe connected to the first pneumatic actuator and the second pneumatic actuator.

3. The suck back system according to claim 2, wherein the branched pneumatic pipe is provided with a solenoid valve configured to control a supply of air pressure to the first pneumatic actuator and the second pneumatic actuator.

4. The suck back system according to claim 2, wherein the branched pneumatic pipe is provided with speed controllers configured to adjust an actuation timing of the first pneumatic actuator and the second pneumatic actuator.

5. The suck back system according to claim 1, wherein the on/off valve comprises:
   a casing having a fluid inlet and a fluid outlet;
   a valve element, configured to open and close the fluid channel, disposed in an inner space of the casing; and
   a suck back chamber disposed above the fluid channel.

6. The suck back system according to claim 5, wherein the fluid inlet communicates with the inner space of the casing through an inlet channel and the fluid outlet communicates with the suck back chamber through an outlet channel.

7. The suck back system according to claim 5, wherein the valve element is operatively connected to the second pneumatic actuator.

8. The suck back system according to claim 7, wherein the second pneumatic actuator comprises:
   a piston; and
   a shaft connecting the piston to the valve element.

9. The suck back system according to claim 8, further comprising a suck-back-leveling adjuster configured to control an amount of movement of the shaft.

10. A valve-closing-operation control method for a suck back system, the suck back system comprising:
   an integral-type suck back valve having an on/off valve operated by a first pneumatic actuator as to close and open a fluid channel;
   a suck back diaphragm provided at a downstream side in the fluid channel relative to the on/off valve, for performing a suck back function by being deformed after the on/off valve is operated to close the fluid channel; and
   a protective on/off valve provided at an adjacent upstream side in the fluid channel relative to the on/off valve of the integral-type suck back valve, the protective on/off valve configured to perform a fully closing operation to fully close the fluid channel at the adjacent upstream side in the fluid channel relative to the on/off valve by a second pneumatic actuator,
   wherein the valve-closing-operation control method comprises:
   controlling the protective on/off valve to complete the fully closing operation earlier than full closing of the on/off valve of the integral-type suck back valve when the on/off valve of the integral-type suck back valve is operated to close the fluid channel.

* * * * *